US010538407B2

(12) United States Patent
Nadagouda

(10) Patent No.: US 10,538,407 B2
(45) Date of Patent: Jan. 21, 2020

(54) REEL DRIVE ASSEMBLY

(71) Applicant: Alfred Cheyne Engineering Limited, Aberdeenshire (GB)

(72) Inventor: Nishant Nadagouda, Aberdeenshire (GB)

(73) Assignee: Alfred Cheyne Engineering Limited, Aberdeenshire (GB)

( * ) Notice: Subject to any disclaimer, the term of this patent is extended or adjusted under 35 U.S.C. 154(b) by 236 days.

(21) Appl. No.: 15/513,901

(22) PCT Filed: Sep. 21, 2015

(86) PCT No.: PCT/GB2015/052715
§ 371 (c)(1),
(2) Date: Mar. 23, 2017

(87) PCT Pub. No.: WO2016/046525
PCT Pub. Date: Mar. 31, 2016

(65) Prior Publication Data
US 2017/0297854 A1    Oct. 19, 2017

(30) Foreign Application Priority Data

Sep. 25, 2014 (GB) .................................. 1416961.9

(51) Int. Cl.
*B65H 49/32* (2006.01)
*B66D 5/00* (2006.01)
(Continued)

(52) U.S. Cl.
CPC ........... *B65H 49/32* (2013.01); *B65H 49/321* (2013.01); *B65H 49/327* (2013.01); *B65H 49/38* (2013.01);
(Continued)

(58) Field of Classification Search
CPC ........ B65H 49/32; B65H 49/36; B65H 49/16; B65H 49/20; B65H 49/38; B65H 49/321;
(Continued)

(56) References Cited

U.S. PATENT DOCUMENTS 4,284,249 A * 8/1981 Legallasi ................ B63B 35/03
242/388.7
4,447,012 A 5/1984 Woodruff
(Continued)

FOREIGN PATENT DOCUMENTS

EP        0549276 A1    6/1993
EP        2743560       6/2014
(Continued)

OTHER PUBLICATIONS

Wikipedia-Actuators; Types: Hydraulic; Published: Sep. 9, 2014; https://en.wikipedia.org/w/index.php?title=Actuator&oldid=626239675 (Year: 2014).*
(Continued)

*Primary Examiner* — Michael R Mansen
*Assistant Examiner* — Raveen J Dias
(74) *Attorney, Agent, or Firm* — Workman Nydegger

(57) ABSTRACT

A modular reel drive assembly comprises two reel drive tower modules (12, 14), a reel hub adapter (54) and a reel hub adapter support module (22, 24). The hub adapter support module (22, 24) comprises at least one support pin which is configured to be movable between a storage position in which the at least one support pin is not aligned with at least one aperture (38, 39, 40, 41) on the hub adapter support module (22, 24) and an operational position in which the support pin is aligned with at least one aperture (38, 39, 40, 41) on the hub adapter support module (22, 24).

30 Claims, 5 Drawing Sheets

(51) Int. Cl.
*B65H 49/38* (2006.01)
*B66D 5/26* (2006.01)
*B65H 67/00* (2006.01)
*B65H 54/553* (2006.01)
*F16M 11/04* (2006.01)
*F16B 15/00* (2006.01)
*B63B 35/00* (2006.01)
*B63B 35/03* (2006.01)
*B63B 35/04* (2006.01)
*F16L 1/20* (2006.01)

(52) U.S. Cl.
CPC .......... *B65H 54/553* (2013.01); *B65H 67/00* (2013.01); *B66D 5/00* (2013.01); *B66D 5/26* (2013.01); *B63B 35/00* (2013.01); *B63B 35/03* (2013.01); *B63B 35/04* (2013.01); *F16B 15/00* (2013.01); *F16L 1/203* (2013.01); *F16M 11/04* (2013.01); *F16M 11/046* (2013.01); *F16M 2200/02* (2013.01)

(58) Field of Classification Search
CPC .... B65H 49/327; B65H 54/54; B65H 54/547; B65H 54/553; B65H 67/00; B66D 5/26; B66D 5/00; B63B 35/00; B63B 35/03; B63B 35/04; F15B 15/261; F15B 15/00; F16M 11/04; F16M 11/046; F16M 2200/02; F16M 2200/024; F16M 2200/028; F16L 1/203
USPC .............................................. 242/598, 598.5
See application file for complete search history.

(56) References Cited

U.S. PATENT DOCUMENTS

| | | | | |
|---|---|---|---|---|
| 5,088,654 | A | * 2/1992 | Cielker | B66F 3/24 242/591 |
| 5,246,180 | A | * 9/1993 | Berry, III | B65H 49/32 242/129.51 |
| 5,378,104 | A | * 1/1995 | Payne, Jr. | B65H 19/126 242/592 |
| 5,425,511 | A | 6/1995 | Pepe | |
| 5,875,991 | A | * 3/1999 | Branchut | B65H 67/00 242/399.1 |
| 9,551,368 | B2 | * 1/2017 | Makela | B65H 54/72 |
| 9,975,727 | B1 | * 5/2018 | Jordan | B65H 49/325 |
| 2009/0045282 | A1 | 2/2009 | Cecil | |
| 2013/0240812 | A1 | * 9/2013 | Helmich | B66F 3/46 254/89 H |

FOREIGN PATENT DOCUMENTS

| | | |
|---|---|---|
| EP | 2743560 A1 | 6/2014 |
| GB | 2236769 | 4/1991 |
| GB | 2236769 A | 4/1991 |

OTHER PUBLICATIONS

International Search Report and Written Opinion for application No. PCT/GB/2015/052715 dated Feb. 9, 2016.

* cited by examiner

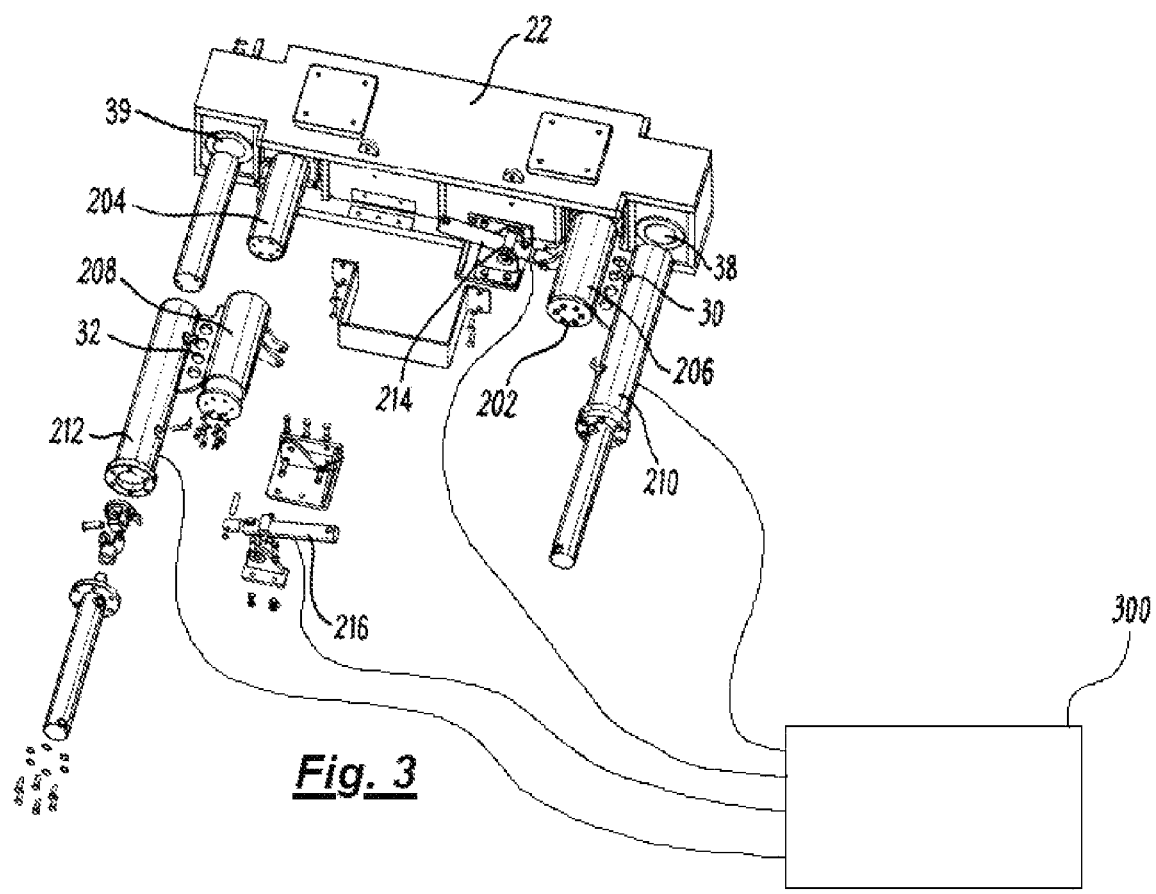

REEL DRIVE ASSEMBLY

CROSS-REFERENCE TO RELATED APPLICATIONS

The present invention is a 35 U.S.C. § 371 U.S. National Stage of International Application No. PCT/GB2015/052715, filed on Sep. 21, 2015, which claims priority to Great Britain Patent Application No. 1416961.9, filed Sep. 25, 2014, the entire content of each of which is incorporated herein by reference.

The present invention relates to a reel drive assembly used to spool cables and other lines onto and off reel drums, and in particular to a modular reel drive assembly. Aspects of the invention include a modular reel drive assembly including an improved reel hub adapter support assembly and a method of use.

BACKGROUND TO THE INVENTION

Reel drive assemblies are required to perform a range of tasks including winding, reeling, spooling, lifting and lowering lines such as cable, rope, wire, umbilicals, flowlines, hoses, pipes, cords, or conduits onto or from a reel.

Typically, reel drive assemblies work in pairs with each assembly utilising a reel hub adapter to engage with one side wall flange of the reel to support and/or drive the reel. The reel drive assemblies generally comprise vertical hydraulic cylinders or jacks to lift the reel out of a cradle to allow the reel to rotate or to be driven during spooling or unspooling onto or off the reel.

U.S. Pat. No. 5,875,991 describes a winch device for winding or unwinding flexible articles. The winch device has a carriage located at each side of the reel drum with each carriage capable of lifting and lowering the reel drum. Bearings on each carriage are capable of moving horizontal to engage and/or disengage with the reel drum.

U.S. Pat. No. 4,284,249 describes a winch device for winding and unwinding elongated articles such as underwater conduit or cables. The winch device has two spaced apart spindles which can be moved vertically, horizontally and towards each other to handle spools when the spool are supported with their axes perpendicular to the direction of unwinding the conduit or cable.

Reel drive assemblies may be required to be transported to a different location. Relocating reel drive assemblies can be cumbersome, time consuming and expensive as they are required to be sturdy and sufficiently large and heavy to support a wide range of reel diameters, sizes and weights.

Furthermore, although the above-described reel drive assemblies are designed to tolerate heavy reel loads, prolonged exposure to heavy reel loads, particularly in environments such as offshore can result in damage to components of the assemblies.

It is an object of an aspect of the present invention to provide a reel drive assembly which is modular; which may be readily transported, assembled and/or disassembled and/or is suitable for a range of applications in offshore and/or onshore environments of different types and sizes.

It is another object of at least one aspect of the present invention to provide a modular reel drive assembly which is designed for easy and rapid assembly and disassembly.

It is amongst the aims of at least one aspect of the invention to provide a reel hub adapter support assembly that is capable of improving the performance of a reel drive assembly by enabling the reel drive assembly to withstand prolonged exposure to heavy reel loads.

Further aims and objects of the invention will become apparent from reading the following description.

SUMMARY OF THE INVENTION

According to a first aspect of the invention, there is provided a modular reel drive assembly comprising:
two reel drive tower modules;
a reel hub adapter; and
a reel hub adapter support module;
wherein the hub adapter support module comprises at least one support pin which is configured to be movable between a storage position in which the at least one support pin is not aligned with at least one aperture on the hub adapter support module and an operational position in which the support pin is aligned with at least one aperture on the hub adapter support module.

The term storage position will be understood to be an inoperative position in which the at least one support pin is retracted or withdrawn from the operational position. The storage position therefore enables assembly, disassembly and/or transport of the modules. In particular, in the storage position, the at least one support pin is clear of the at least one aperture on the hub adapter support module, and therefore does not hamper or impede assembly and/or disassembly or transportation of the modules.

In contrast, the operational position will be understood to be an operative position in which the at least one support pin is aligned with at least one aperture on the hub adapter support module, and is ready to be operated to extend or retract the support pin into the aperture.

The reel hub adapter support module with at least one support pin is capable of being moved between a storage position and an operational position which may facilitate easy assembly, disassembly and/or transport of the modular reel drive assembly. The at least one support pin may be configured to be positioned in a storage position during assembly, disassembly and/or transport of the reel drive assembly which may prevent the at least one support pin from contacting, or being an obstacle to, other components of the reel drive assembly.

The invention may provide a robust, reliable and sturdy reel drive assembly. The ability of the support pin to be moved between an operational position and a storage position may prevent the support pin being damaged during assembly, disassembly or transport of the hub adapter support module.

Preferably the reel drive assembly comprises a base frame module. The two reel drive tower modules may be moveably mounted on the base frame module. The base frame may be configured to be mounted on tracks or rails.

Preferably the hub adapter support module is movably mounted between the two reel drive tower modules and the at least one aperture on the hub adapter support module is configured to be aligned with at least one aperture on at least one reel drive tower module.

The reel drive assembly may comprise a control unit which is configured to control the movement of the support pin. The control unit may be configured to control the movement of the support pin between a storage position and an operational position.

The control unit may be configured to control the extension or retraction of the support pin through the aperture on the hub adapter support module and/or through at least one aperture on at least one tower module.

The reel drive assembly may be used to spool a wide variety of lines, including but not limited to cable, tether, rope, wire, wire rope, flowlines, umbilical, pipe, cord or conduit onto or from a reel.

Preferably the reel hub adapter is configured to engage one side of a reel drum. The reel drive reel hub adapter may be configured to be movably mounted between the two reel drive tower modules.

Preferably the reel hub adapter is mounted on the hub adapter support module.

Preferably the reel hub adapter support module comprises a sliding drive unit. More preferably the reel hub adapter support module comprises a sliding drive unit and a crawler unit.

The reel hub adapter support module may comprise at least one lifting device to lift the reel hub. The lifting device may be a mechanical, hydraulic or pneumatic lifting device. Preferably the lifting device is a hydraulic cylinder such as a hydraulic jack.

Preferably the at least one lifting device is located between the sliding drive unit and the crawler unit. The at least one lifting device may be configured to extend or retract between the sliding drive unit and the crawler unit.

The hub adapter support module may comprise least one hydraulic cylinder configured to extend or retract the support pin through the aperture on the hub adapter support module.

Preferably the least one hydraulic cylinder is configured to extend or retract the support pin through the aperture on the hub adapter support module and through at least one aperture on the tower modules.

The hub adapter support module may comprise at least one hydraulic cylinder configured to move the at least one support pin between an operational position and a storage position.

The hub adapter support module may comprise a protective frame.

Preferably, in the storage position the at least one support pin is within a volume defined by the protective frame.

Preferably, in the operational position the at least one support pin is located outside a volume defined by the protective frame.

Preferably, the protective frame is configured to protect the at least one support pin when in a storage position. Preferably the protective frame is located on the sliding drive unit.

The reel drive towers may each comprise at least one channel located on the inside surface of each tower. Preferably each reel drive tower comprises a channel and the reel hub adapter support module is slidably mounted between the two reel drive tower modules in the channels.

Preferably the at least one channel is a U-shaped channel.

The reel drum hub adapter may be driven by a motor. The motor may be mounted on the reel hub adapter support module. Preferably the motor may be mounted on the sliding drive unit.

According to a second aspect of the invention, there is provided a reel hub adapter support module for use in a reel drive assembly comprising: at least one support pin configured to extend through an aperture on the reel hub support module;

wherein the at least one support pin is configured to move between a storage position in which the at least one support pin is not aligned with at least one aperture on the hub support adapter module and an operational position in which the support pin is aligned with at least one aperture on the hub adapter support module.

The hub adapter support module may comprise at least one hydraulic cylinder configured to move the at least one support pin between a storage position and an operational position.

The hub adapter support module may comprise at least one hydraulic cylinder configured to extend or retract the support pin through the aperture on the hub adapter support module.

Preferably the reel hub adapter support module comprises a sliding drive unit. More preferably the reel hub adapter support module comprises a sliding drive unit and a crawler unit.

The reel hub adapter support module may comprise at least one hydraulic cylinder located between the sliding drive unit and the crawler unit. The at least one hydraulic cylinder may be configured to extend or retract between the sliding drive unit and the crawler unit.

Preferably the sliding drive unit comprises at least one hydraulic cylinder configured to extend or retract the support pin through an aperture on the sliding drive unit and through at least one aperture on at least one of the tower module.

Preferably the crawler unit comprises at least one hydraulic cylinder configured to extend or retract the support pin through an aperture on the crawler unit and through at least one aperture on at least one of the tower module.

Preferably the sliding drive unit and/or the crawler unit may comprise at least one positional hydraulic cylinder configured to move the at least one support pin between an operational position and a storage position.

The reel hub adapter support module may comprise or be connected to a control unit which is configured to control the movement of the support pin between a storage position and an operational position Preferably the hub adapter support module is configured to be slidably mounted between two reel drive tower modules.

Preferably the at least one hydraulic cylinder is configured to extend or retract the support pin through the aperture on the hub adapter support module and through at least one aperture on at least one of the reel drive tower modules.

The reel hub adapter support module may be connected to a control unit configured to control the extension or retraction of the support pin through the aperture on the hub adapter support module and/or through at least one aperture on at least one tower module.

The sliding drive unit and/or crawler unit may comprise a protective frame configured to protect the at least one support pin when in a storage position.

Embodiments of the second aspect of the invention may comprise features corresponding to the preferred or optional features of the first aspect of the invention or vice versa.

According to a third aspect of the invention there is provided a method of assembling a modular reel drive assembly comprising the steps of:

providing two reel drive tower modules; and a reel hub adapter support module comprising:

at least one support pin configured to extend through an aperture on the reel hub support assembly;

mounting the reel hub adapter support module between the two reel drive tower modules; and moving the at least one support pin from a storage position in which the at least one support pin is not aligned with at least one aperture on the hub adapter support module to an operational position in which the at least one support pin is aligned with at least one aperture on the hub adapter support module.

By providing a reel drive assembly composed of prefabricated functional modules ready for assembly, the modular assembly may facilitate easy assembly, disassembly and transportation of the reel drive assembly.

The reel hub adapter support module having at least one support pin which is capable of being moved between an operational position and a storage position may facilitate easy assembly and/or disassembly of the modular reel drive assembly.

The at least one support pin may be located at the retracted storage position during or before transport of the reel hub adapter support module. Alternately or additionally the at least one support pin may be moved to the retracted storage position during or before assembly of the reel drive assembly. By locating the at least one support pin at the storage position before or during assembly it may facilitate the mounting of the reel hub adapter support module on, in or to the assembly. The positioning of the least one support pin in the storage position prevents the at least one support pin from contacting, or being an obstacle to, other components of the reel drive assembly during assembly. The reel hub adapter support module may then be positioned and/or mounted between the two reel drive tower modules.

The positioning of the least one support pin in the storage position may also prevent the at least one support pin from being damaged during transport.

The method may comprise controlling the movement of the at least one support pin between a storage position and an operational position. Preferably, the method may comprise controlling the movement of the at least one support pin from a storage position to an operational position.

The method may comprise the step of moving the at least one support pin from an operational position in which the at least one support pin is aligned with at least one aperture on the reel hub adapter support module to a storage position in which the at least one support pin is not aligned with at least one aperture on the hub adapter support module prior to mounting the reel hub adapter support module between the two reel drive tower modules.

The method may comprise extending or retracting the at least one support pin through the aperture on the reel hub adapter support module and/or through at least one aperture on at least one reel drive tower module.

The method may comprise controlling the extension or retraction of the at least one support pin through the aperture on the reel hub adapter support module and/or through at least one aperture on at least one reel drive tower module.

The method may comprise mounting the two reel drive tower modules on a base frame module. The method may comprise moveably mounting the tower modules on the base frame module.

The method may comprise mounting a reel hub adapter on the reel hub adapter support module.

Embodiments of the third aspect of the invention may comprise features corresponding to the preferred or optional features of the first or second aspects of the invention or vice versa.

According to a fourth aspect of the invention there is provided a method of disassembling a modular reel drive assembly comprising the steps of:

providing a modular reel drive assembly comprising two reel drive tower modules and a reel drive hub adapter support module mounted between the two reel drive tower modules;

wherein the reel hub adapter support module comprises at least one support pin configured to extend through an aperture on the hub adapter support module;

moving the at least one support pin from a operational position in which the support pin is aligned with at least one aperture on the hub adapter support module to a storage position in which the at least one support pin is not aligned with at least one aperture on the hub adapter support module; and removing the hub adapter support module from between the at least two tower modules.

By moving the at least one support pin to the retracted storage position before or during disassembly it may facilitate the removal, dismounting and/or disassembly of reel hub adapter support module from the assembly. Once the at least one support pin is moved to the retracted storage position it may be removed from between the two reel drive tower modules. The positioning of the least one support pin in the retracted storage position prevents the at least one support pin from contacting, or being an obstacle to, other components of the reel drive assembly during disassembly.

The method may comprise controlling the movement of the at least one support pin between an operational position and a storage position. Preferably the method may comprise controlling the movement of the at least one support pin from an operational position to a storage position.

The method may comprise retracting the at least one support pin through the aperture on the reel hub adapter support module and/or through at least one aperture on at least one reel drive tower module prior to moving the at least one support pin from an operational position to a storage position.

The method may comprise controlling the retraction of the at least one support pin through the aperture on the reel hub adapter support module and/or through at least one aperture on at least one reel drive tower module.

The method may comprise disassembling a reel hub adapter from the reel hub adapter support module.

The method may comprise disassembling the two reel drive tower modules from a base frame module.

Embodiments of the fourth aspect of the invention may comprise features corresponding to the preferred or optional features of the first, second or third aspects of the invention or vice versa.

According to a fifth aspect of the invention there is provided a modular reel drive assembly comprising:

two reel drive tower modules;

a reel hub adapter; and a reel hub adapter support module;

wherein the hub adapter support module comprises at least one support pin which is configured to move between a storage position in which the at least one support pin is within a volume defined by a protective frame and an operational position in which the support pin is located outside a volume defined by a protective frame.

Preferably, in the storage position the at least one support pin is not aligned with at least one aperture on the hub adapter support module.

Preferably, in the operational position the at least one support pin is aligned with at least one aperture on the hub adapter support module.

Embodiments of the fifth aspect of the invention may include one or more features of the first to fourth aspects of the invention or their embodiments, or vice versa.

According to a sixth aspect of the invention, there is provided a reel hub adapter support module for use in a reel drive assembly comprising:

at least one support pin configured to extend through an aperture on the reel hub support module;

wherein the at least one support pin is configured to move between a storage position in which the at least one support pin is within a volume defined by a protective frame and an operational position in which the support pin is located outside a volume defined by a protective frame.

Embodiments of the sixth aspect of the invention may include one or more features of the first to fifth aspects of the invention or their embodiments, or vice versa.

According to a seventh aspect of the invention there is provided a method of assembling a modular reel drive assembly comprising the steps of:

providing two reel drive tower modules; and a reel hub adapter support module comprising:

at least one support pin configured to extend through an aperture on the reel hub support assembly;

mounting the reel hub adapter support module between the two reel drive tower modules;

and moving the at least one support pin from a storage position in which the support pin is located within a volume defined by a protective frame to an operational position in which the at least one support pin is outside a volume defined by a protective frame.

Embodiments of the seventh aspect of the invention may include one or more features of the first to sixth aspects of the invention or their embodiments, or vice versa.

According to a eighth aspect of the invention there is provided a method of disassembling a modular reel drive assembly comprising the steps of:

providing a modular reel drive assembly comprising two reel drive tower modules and a reel drive hub adapter support module mounted between the two reel drive tower modules;

wherein the reel hub adapter support module comprises at least one support pin configured to extend through an aperture on the hub adapter support module;

moving the at least one support pin from an operational position in which the at least one support pin is outside a volume defined by a protective frame to a storage position in which the support pin is located within a volume defined by a protective frame; and removing the hub adapter support module from between the at least two tower modules.

Embodiments of the eighth aspect of the invention may include one or more features of the first to seventh aspects of the invention or their embodiments, or vice versa.

BRIEF DESCRIPTION OF THE DRAWINGS

There will now be described, by way of example only, various embodiments of the invention with reference to the following drawings (like reference numerals referring to like features) in which:

FIG. 3 presents a crawler unit of the modular reel drive assembly of FIG. 1 shown in partially exploded perspective view.

DETAILED DESCRIPTION OF PREFERRED EMBODIMENTS

As discussed in the background to the invention above, it is an object of at least one aspect of the present invention to provide a reel drive assembly which is modular; which may be readily transported, assembled and/or disassembled and is suitable for a range of applications in offshore and/or onshore environments of different types and sizes.

Figure 1A:
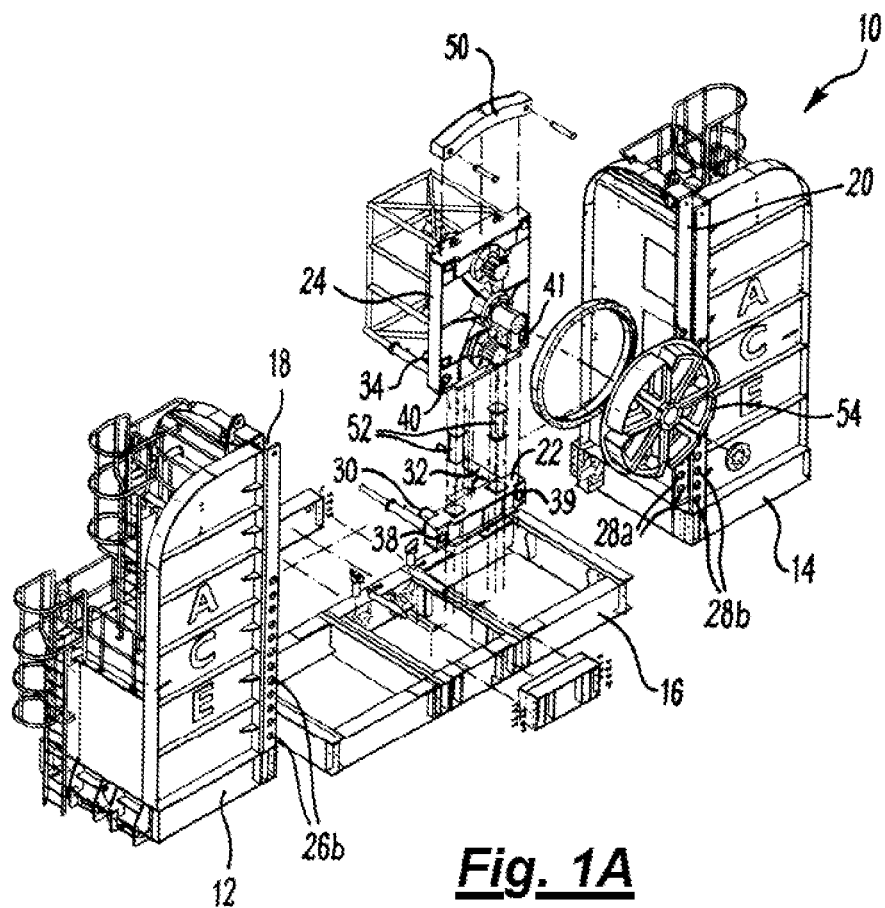
FIG. 1A presents a modular reel drive assembly shown in partially exploded perspective view.
Figure 1B:
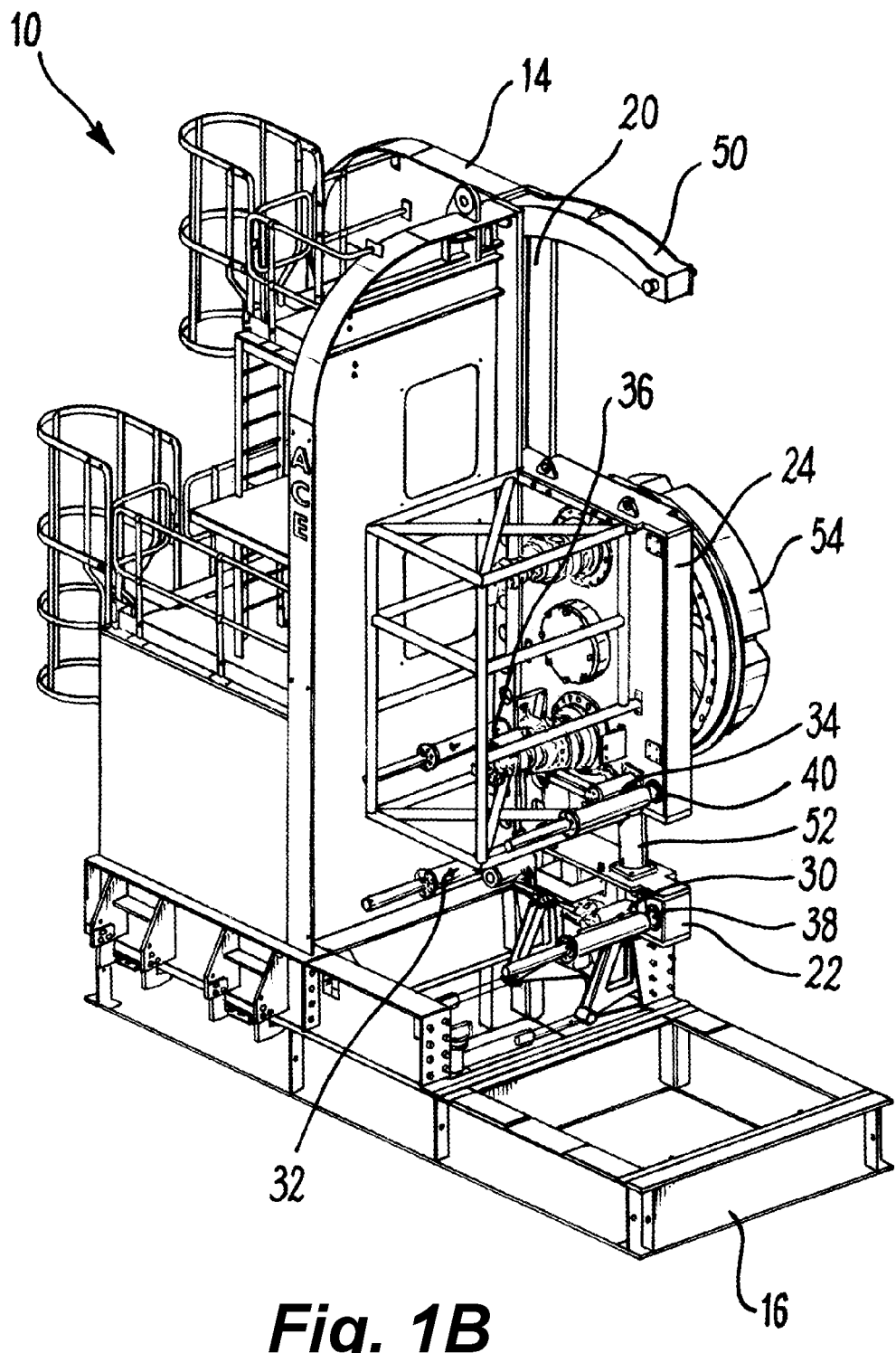
FIG. 1B presents a modular reel drive assembly shown in partially assembled perspective view with a tower module removed for clarity.

FIGS. 1A and 1B show a modular reel drive assembly 10 according to a first embodiment of the invention. FIG. 1A shows a partially exploded schematic view and FIG. 1B shows an partially assembled view of the modular reel drive assembly with one tower module removed (tower 12) for clarity.

The modular reel drive assembly 10 can be seen to comprise a first tower module 12 and a second tower module 14 mountable on base frame module 16. When assembled the first and second tower modules 12, 14 are axially aligned and opposed structures which are separated by a gap. Channels 18 and 20 are provided on tower modules 12 and 14 respectively. A reel hub adapter support module comprises a crawler unit 22 and a sliding drive unit 24 is located between the tower modules 12 and 14 and is slideably mounted in the channels 18 and 20. A reel drive hub adapter 54 is mounted on the sliding drive unit 24. The reel drive hub adapter 54 is configured to engage one side of a reel (not shown).

The crawler unit 22 and sliding drive unit 24 are configured to move in the channels 18 and 20. The channel 18 has a vertical series of holes on each peripheral edge only holes 26b can been seen in FIG. 1A, which are configured to receive a supporting pin of the crawler unit 22 and a supporting pin of the sliding drive unit 24. The channel 20 has a vertical series of holes 28a and 28b on each peripheral edge which are configured to receive a supporting pin of the crawler unit 22 and a supporting pin of the sliding drive unit 24.

On the rear side of the crawler unit 22 and sliding drive unit 24 are mounted support pin hydraulic units 30, 32, 34 and 36. The crawler unit 22 is configured to be locked into a selected position or height relative to the tower modules 12 and 14 by actuating the support pin hydraulic units 30 and 32.

The support pin hydraulic unit 30 on the crawler unit 22 is configured to extend a support pin first through one of a series of holes on the first peripheral edge of channel 18, then through hole 38 in the crawler unit 22 and extend through a corresponding hole 26b on the second peripheral edge of channel 18. The support pin hydraulic unit 32 on the crawler unit 22 performs a similar action to position a supporting pin thorough a hole 28a, then through hole 39 in the crawler unit and finally through hole 28b of channel 20.

Similarly the sliding drive unit 22 is configured to be locked at a selected position or height relative to the tower modules 12 and 14 by actuating the support pin hydraulic units 34 and 36. The support pin hydraulic unit 34 on the sliding drive unit 24 is configured to extend a support pin first through a hole on the first peripheral edge of channel 18, then through hole 40 in the sliding drive unit 24 and extending through corresponding hole 26b on the second peripheral edge of channel 18. The support pin hydraulic unit 36 performs a similar action to position a supporting pin thorough one of a series of holes 28a, then through hole 41 in the sliding drive unit and finally through corresponding hole 28b of channel 20.

Figure 2A:
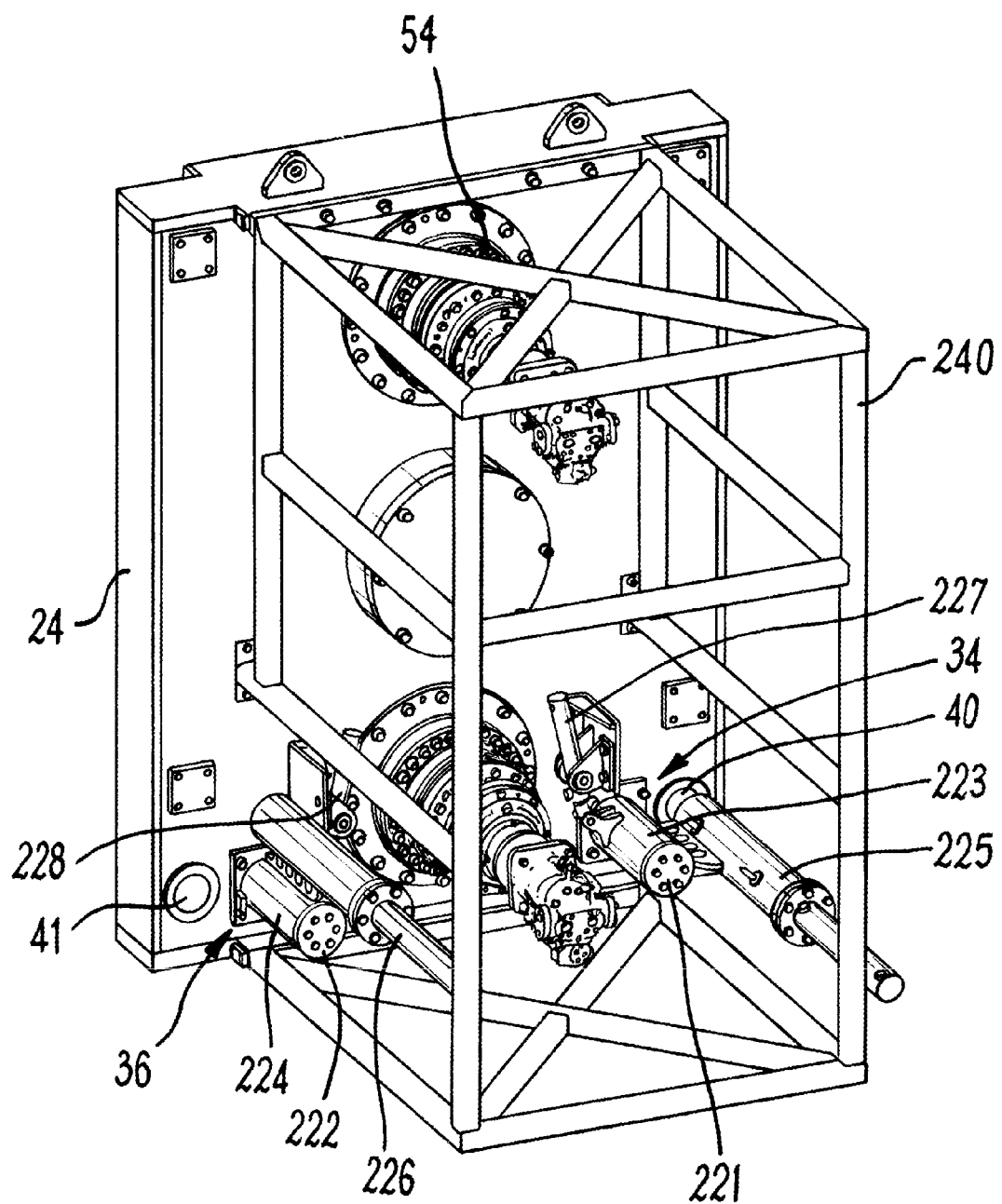
FIG. 2A presents a sliding drive unit of the modular reel drive assembly of FIG. 1 shown in perspective view.
Figure 2B:
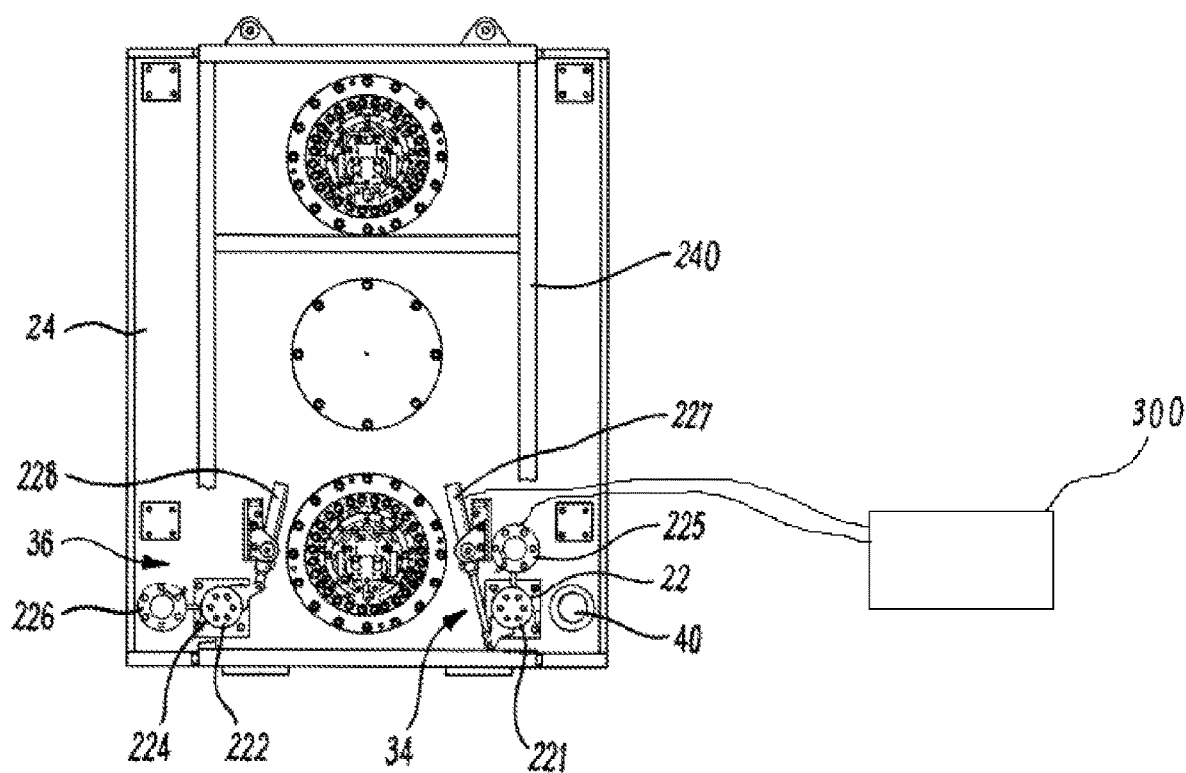
FIG. 2B presents a sliding drive unit of the embodiment of FIG. 2A shown in profile view.

FIGS. 2a and 2b show the sliding drive unit 24 of the reel hub support assembly according to a second embodiment of the invention, shown in perspective and profile views. Hydraulic units 34 and 36 are pivotally mounted on the sliding drive unit 24. The hydraulic units 34 and 36 comprise support members 221 and 222, sleeve members 223 and 224, support pin hydraulic cylinders 225 and 226 and positioning hydraulic cylinders 227 and 228 respectively.

The support member 221 of the hydraulic unit 34 is affixed to the sliding drive unit 24 and secures the hydraulic unit 34 to the sliding drive unit 24. The support member 221 is secured to the sliding drive unit using bolts. This is merely an example and any other manner of affixing the support member 221 to the sliding drive unit may be used, such as welding if the material is suitable.

The sleeve member 223 is affixed to the support pin hydraulic cylinder 225 and is configured to be rotationally mounted on the support member 221. The positioning hydraulic cylinder 227 is pivotally attached to the sleeve member 223 and is configured to pivotally rotate the sleeve member 223 and the affixed support pin hydraulic cylinder 225 during actuation of the positioning hydraulic cylinder 227.

A control unit 300 is connected to the support pin hydraulic cylinder 225 and the positioning hydraulic cylinder 227 and is configured to control the position of the support pin hydraulic cylinder 225 by controlling the actuation of the positioning hydraulic cylinder 227. The control unit is also configured to control the actuation of the support pin hydraulic cylinder 225 to extend the support pin through the hole 40.

The hydraulic unit 36 functions in the same manner as the hydraulic unit 34. The actions of the support members 222, sleeve members 224, support pin hydraulic cylinders and 226 and positioning hydraulic cylinders 228 are similar for the corresponding components on the hydraulic unit 34 as described above. The control unit is configured to control the actuation of the support pin hydraulic cylinder 226 and positioning hydraulic cylinder 228.

FIG. 2b shows the hydraulic unit 36 positioned in an operational position and the hydraulic unit 34 in a storage position. The hydraulic units 34 and 36 may be configured to be positioned in either an operational position or a storage position at the same time. However, for illustration the control unit has actuated the hydraulic units 34 and 36 to position the hydraulic unit 34 in a storage position and the hydraulic unit 36 in an operational position.

In the storage position the support pin hydraulic cylinder 225 of hydraulic unit 34 is not aligned with the hole 40 in the sliding drive unit 24.

To move the support pin hydraulic cylinder 225 from an operational position to a storage position the support pin hydraulic cylinder 225 is pivoted about the support member 221 away from the periphery of the sliding drive unit 24 to a position inside the perimeter of a protective frame 240. The support pin hydraulic cylinder 225 is pivoted about the support member 221 by actuating the positioning hydraulic cylinder 227 to an extended position. As the positioning hydraulic cylinder 227 extends it pushes the support pin hydraulic cylinder 225 in an anticlockwise direction about the support member 221. Once the positioning hydraulic cylinder 227 has fully extended the support pin hydraulic cylinder 225 has been moved out of alignment with the hole 40 in the sliding drive unit and within the perimeter of the protective frame 240.

By positioning the support pin hydraulic cylinder 225 and 226 within the perimeter of protective frame they are protected from impacts during the assembly or dismantling of the reel drive assembly and during the transportation of the sliding drive unit 24 to a new location.

The positioning of the support pin hydraulic cylinder 225 and 226 in the storage state also enable the sliding drive unit 24 to be positioned in the channels 18 and 20 of the towers 12 and 14 during the assembly of the reel drive assembly without the support pin hydraulic units 225 and 226 being an obstacle and clashing with the tower modules 12 and 14.

In the operational position the support pin hydraulic cylinder 226 of hydraulic unit 36 is aligned with the hole 41 in the sliding drive unit 24.

To move the support pin hydraulic cylinder 226 from a storage position to an operational position the support pin hydraulic cylinder 226 is pivoted about the support member 222 toward the periphery of the sliding drive unit 24 and outside the perimeter of protective frame 240. The support pin hydraulic cylinder 226 is pivoted about the support member 222 by actuating the positioning hydraulic cylinder 228 to a retracted position. As the positioning hydraulic cylinder 228 retracts it pulls the support pin hydraulic cylinder 226 in an anticlockwise direction about the support member 222. Once the positioning hydraulic cylinder 228 has fully retracted the support pin hydraulic cylinder 226 is aligned with hole 41 in the sliding drive unit.

Furthermore, while in this example the support pin hydraulic cylinders are described as being moved between a storage and operational position by the actuation of the positioning hydraulic cylinder from an extended to a retracted position, this is merely an example and any other manner of configuring the positioning hydraulic cylinder may be used. For example, the positioning hydraulic cylinders and support pin hydraulic cylinders may be configured such that the support pin hydraulic cylinders are moved between a storage and operational position by the actuation of the positioning hydraulic cylinder from a retracted to an extended position.

FIG. 3 shows the crawler unit 22 of the reel hub adapter support module according to a second embodiment of the invention, shown in an exploded schematic view. Hydraulic units 30 and 32 are pivotally mounted to the crawler unit 22. The hydraulic unit 30 is shown in an partially assembled schematic view and hydraulic unit 32 is shown in an exploded schematic view. The hydraulic units 30 and 32 comprise support members 202 and 204, sleeve members 206 and 208, support pin hydraulic cylinders 210 and 212, and positioning hydraulic cylinders 214 and 216 respectively.

The support members 202 and 204 are affixed to the crawler unit 22 and secure the hydraulic units 30 and 32 to the crawler unit 22. The support member 202 and 204 are secured to the crawler unit using bolts. This is merely an example and any other manner of affixing the support members 202 and 204 to the crawler unit 22 may be used, such as welding if the material is suitable.

The sleeve members 206 and 208 are affixed to support pin hydraulic cylinder 210 and 212 respectively and sleeve members 206 and 208 are configured to be rotationally mounted on support members 202 and 204. The sleeve members 206 and 208 may be affixed by any suitable means such as bolts or welding. Alternatively the sleeve members 206 and 208 may be integrally formed with the housing of the support pin hydraulic cylinders 210 and 212.

The positioning hydraulic cylinders 214 and 216 are pivotally attached to the sleeve members 206 and 208 and the positioning hydraulic cylinders 214 and 216 are configured to pivotally rotate the sleeve members 206 and 208 and the support pin hydraulic cylinders 210 and 212 during actuation of the positioning hydraulic cylinder 214 and 216.

A control unit 300 is connected to the support pin hydraulic cylinders 210 and 212 and the positioning hydraulic cylinders 214 and 216. The control unit is configured to control the position of the support pin hydraulic cylinders 210 and 212 by controlling the actuation of the positioning hydraulic cylinders 214 and 216. The control unit is also configured to control the actuation of the support pin hydraulic cylinder 210 and 212 to extend or retract the support pins through the holes 38 and 39.

One benefit of using a control unit to control the support pin hydraulic cylinders 210 and 212 and the positioning hydraulic cylinders 214 and 216 is that it saves times during the assembly and disassembly of the reel drive assembly. A further benefit is that it enables the hydraulic cylinders to be actuated remotely and ensures that workers are not put at risk by having to move or operate heavy components at height.

The pivotal operation of support pin hydraulic cylinders 210 and 212 on the crawler unit 22 between a storage and operational position are equivalent to the support pin hydraulic cylinders 225 and 226 as described in relation to FIGS. 2A and 2B above.

The assembly and use of the reel drive assembly will now be described using the reference numbers of FIGS. 1A, 1B, 2A, 2B and 3 above.

To assemble the reel drive assembly 10 the tower modules 12 and 14 are first moveably mounted onto the base frame 16. The crawler unit 22 is positioned in the channels 18 and 20 of the towers 12 and 14. The support pin hydraulic units 30 and 32 on the crawler unit are positioned in a storage position. In this storage position the support pin hydraulic unit 30 and 32 are not aligned with their corresponding holes 38 and 39 in the crawler unit but are pivoted away from the periphery of the crawler unit. By positioning the support pin hydraulic units 30 and 32 in a storage position it allows the crawler unit to be positioned in the channels 18 and 20 of the tower modules 12 and 14 without the support pin hydraulic units 30 and 32 clashing with the tower modules 12 and 14.

The crawler unit is moved downward along channels 18 and 20 in the gap between the towers. Once the crawler unit 22 is located in the channels 18 and 20 in the gap between the towers 12 and 14, the hydraulic units 30 and 32 are moved into an operational position. The support pin hydraulic cylinders 210 and 212 of hydraulic units 30 and 32 are moved toward the periphery of the crawler unit 22 until the support pin hydraulic cylinders 210 and 212 are aligned with the holes 38 and 39 of the crawler unit.

Hydraulic jacks 52 are mounted and secured on the crawler unit 22 using bolts. This is merely an example and any other manner of affixing the hydraulic jacks 52 to the crawler unit 22 may be used, such as welding if the material is suitable.

The sliding drive unit 24 is positioned in the channels 18 and 20 of the towers 12 and 14. The support pin hydraulic units 34 and 36 on the sliding drive unit are in their storage position. In this storage position the support pin hydraulic unit 34 and 36 are not aligned with their corresponding holes 40 and 41 in the crawler unit but are pivoted away from the periphery of the sliding drive unit and allow the sliding drive unit to be positioned in the channels 18 and 20 of the towers 12 and 14 without the support pin hydraulic units 34 and 36 clashing with the towers 12 and 14. The sliding drive unit 24 is moved downwards along channels 18 and 20 in the gap between the towers. Once the sliding drive unit is located in the channels 18 and 20 in the gap between the towers 12 and 14, the support pin hydraulic cylinders 225 and 226 of the hydraulic units 34 and 36 are moved into an operational position. The support pin hydraulic cylinders 225 and 226 are moved toward the periphery of the sliding drive unit 24 until the support pins of the support pin hydraulic units 34 and 36 are aligned with the holes 40 and 41 of the sliding drive unit.

The sliding drive unit 24 is moved downwards along channels 12 and 14 in the gap between the tower modules 12 and 14 and is mounted on the hydraulic jacks 52. The sliding drive unit 24 is secured on the hydraulic jacks 52 using bolts. This is merely an example and any other manner of affixing the sliding drive unit 24 to the hydraulic jacks 52 may be used, such as welding if the material is suitable.

Finally a top tie bar 50 is located and secured in the channels 18 and 20 and bridges the gap between the tower modules 12 and 14 to provide strength to the reel drive structure and to limit the height reached by the sliding drive unit 24 in the channels 18 and 20.

In the above description the reel hub adapter support module is constructed during assembly of the reel drive assembly. Alternatively the crawler unit 22, hydraulic jacks 52 and sliding drive unit may be assembled in to the reel hub adapter support module which may be transported as pre-fabricated module and used in the assembly the reel drive assembly.

During use the reel drive assembly 10 works in co-operation with a second reel drive assembly (not shown). Each reel drive assembly engages one side of a reel drum. Each reel drive assembly may have hydraulic cylinders to horizontally move the reel drive assembly to engage the reel drum. The crawler unit 22 and the sliding drive unit 24 of the reel hub adapter support module are located in a first position to engage the reel (not shown). Once the reel drum has been connected to the reel drive hub adapter 54 on the hydraulic jacks 52 are actuated to move the sliding drive unit 24 upwards relative to the crawler unit 22. Once the sliding drive unit 24, reel drive hub adapter 54 and connected reel drum have been lifted off a reel support cradle (not shown) to a desired height a control unit may actuate the support pin hydraulic units 34 and 36 to extend support pins thorough one of a series of holes (only holes 28a of channel 20 can be seen in FIG. 1A), then through holes 40 and 41 in the sliding drive unit and finally through corresponding hole 26b and 28b of channels 18 and 20 to secure the sliding drive unit 24 and the reel drive hub adapter 54 and attached reel drum in position.

In the event that the reel drum must be lifted higher than the height range of the hydraulic jacks 52. The reel drum is first connected to the reel drive hub adapter 54 as described above. The hydraulic jacks 52 are actuated to move the sliding drive unit 24 upwards relative to the crawler unit 22. Once the sliding drive unit 24 has been lifted to a desired height or to the height range limit of the hydraulic jacks 52, a control unit may actuate the support pin hydraulic units 34 and 36 of the sliding drive unit, to extend support pins thorough one of a series of holes (only holes 28a of channel 20 can be seen in FIG. 1A), then through holes 40 and 41 in the sliding drive unit 24 and finally through corresponding hole 26b and 28b of channels 18 and 20 to secure the sliding drive unit 24, reel drive hub adapter 54 and attached reel drum to the tower modules 12 and 14.

The hydraulic jacks 52 are actuated to retract the jacks 52. By retracting the jacks the crawler unit 24 is pulled upwards in channels 18 and 20 toward the sliding drive unit 24. Once the hydraulic jacks have been returned to a fully retracted position a control unit 300 may actuate the support pin hydraulic units 30 and 32 to extend support pins thorough one of a series of holes (only holes 28a of channel 20 can be seen in FIG. 1A), then through holes 38 and 39 in the crawler unit and finally through corresponding hole 26b and 28b of channels 18 and 20 to secure the crawler unit in position to the tower modules 12 and 14.

The control unit may actuate the support pin hydraulic units 34 and 36 to retract the sliding drive unit support pins to enable the sliding drive unit 24 and the reel drive hub adapter 54 and attached reel drum to be moved. The control unit may actuate the hydraulic jacks 52 to extend the jacks 52 and move the sliding drive unit 24 upwards in channel 18 and 20 relative to the secured crawler unit 22 until the sliding drive unit 24, reel drive hub adapter 54 and attached reel drum have been lifted to a desired height.

Once the desired height is reached the control unit may actuate the support pin hydraulic units 34 and 36 to extend support pins thorough one of a series of holes (only holes 28a of channel 20 can be seen in FIG. 1A), then through holes 40 and 41 in the sliding drive unit and finally through corresponding hole 26b and 28b of channels 18 and 20 to secure the sliding drive unit 24, reel drive hub adapter 54 and attached reel drum in position.

A modular reel drive assembly comprises two reel drive tower modules, a reel hub adapter and a reel hub adapter support module. The hub adapter support module comprises at least one support pin which is configured to be movable between a storage position in which the at least one support pin is not aligned with at least one aperture on the hub adapter support module and an operational position in which the support pin is aligned with at least one aperture on the hub adapter support module.

The invention offers a number of advantages with respect to conventional reel drive assemblies. The modularity of the assembly enables individual modules to be readily transported to an offshore or onshore location which enables a wide range of transport options to be used and reduces transportation costs.

By providing reel drive assembly composed of prefabricated functional modules ready for assembly, the modular assembly may facilitate easier and faster assembly, disassembly and transportation of the reel drive assembly. The various modules of the assembly may also be standardised to facilitate replacement or repair of individual modules.

A reel hub adapter support module which contains support pins configured to engage the tower modules the load or weight of the reel may be transferred from the hub adapter support module to the tower modules via the reel drive reel hub adapter support module and support pins. This has the advantage that the vertical hydraulic jacks which are used to lift and lower the reel drive reel hub are not subjected to prolonged exposure to heavy reel loads and their working life may be extended.

The above invention may provide a robust, reliable and sturdy reel drive assembly. The ability of the support pin to be moved between an operational position and a storage position may prevent the support pin from contacting, or being an obstacle to, other components of the reel drive assembly. This may facilitate easy and rapid assembly and disassembly of the reel drive assembly. It may also prevent the support pin being damaged during assembly, disassembly or transport of the hub adapter support module.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers. Furthermore, relative terms such as "up", "down", "top", "bottom", "upper", "lower", "upward", "downward", "horizontal", "vertical", "clockwise", "anticlockwise", "extend", "retract" and the like are used herein to indicate directions and locations as they apply to the appended drawings and will not be construed as limiting the invention and features thereof to particular arrangements or orientations.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A modular reel drive assembly comprising:
two reel drive tower modules;
a reel hub adapter; and
a reel hub adapter support module;
wherein the reel hub adapter support module comprises at least one support pin which is configured to be movable between a storage position in which the at least one support pin is not aligned with at least one aperture on the reel hub adapter support module and an operational position in which the at least one support pin is aligned with at least one aperture on the reel hub adapter support; and
wherein the reel hub adapter support module comprises at least one hydraulic cylinder configured to move the at least one support pin between the storage position and the operational position.

2. The modular reel drive assembly as claimed in claim 1 wherein the at least one aperture on the reel hub adapter support module is configured to be aligned with at least one aperture on at least one reel drive tower module.

3. The modular reel drive assembly as claimed in claim 1 wherein the modular reel drive assembly comprises a control unit which is configured to control the movement of the at least one support pin.

4. The modular reel drive assembly as claimed in claim 3 wherein the control unit which is configured to control the movement of the at least one support pin between the storage position and the operational position and/or wherein the control unit which is configured to control the extension or retraction of the support pin through the at least one aperture on the reel hub adapter support module and/through at least one aperture on at least one reel drive tower module.

5. The modular reel drive assembly as claimed in claim 4 wherein the two reel drive tower modules are moveably mounted on a base frame module.

6. The modular reel drive assembly as claimed in claim 1 wherein the reel hub adapter is mounted on the reel hub adapter support module.

7. The modular reel drive assembly as claimed in claim 1 wherein the reel hub adapter support module comprises a sliding drive unit and/or a crawler unit.

8. The modular reel drive assembly as claimed in claim 1 wherein the reel hub adapter support module comprises at least one lifting device to lift the reel hub adapter.

9. The modular reel drive assembly as claimed in claim 1 wherein the reel hub adapter support module comprises at least one hydraulic cylinder configured to extend or retract the at least one support pin through the at least one aperture on the reel hub adapter support module and through at least one aperture on the two reel drive tower modules.

10. The modular reel drive assembly as claimed in claim 1 wherein the reel hub adapter support module comprises a protective frame configured to protect the at least one support pin when in the storage position.

11. The modular reel drive assembly as claimed in claim 1 wherein each of the reel drive tower modules comprises at least one channel.

12. The modular reel drive assembly as claimed in claim 11 wherein the reel hub adapter support module is slidably mounted between the two reel drive tower modules in the at least one channel on each reel drive tower module.

13. The modular reel drive assembly as claimed in claim 1 wherein the reel hub adapter is driven by a motor.

14. The modular reel drive assembly as claimed in claim 13 wherein the motor is mounted on the reel hub adapter support module.

15. A reel hub adapter support module for use in a reel drive assembly comprising:
at least one support pin configured to extend through at least one aperture on the reel hub adaptor support module;
wherein the at least one support pin is configured to move between a storage position in which the at least one support pin is not aligned with at least one aperture on the reel hub adapter support module and an operational position in which the at least one support pin is aligned with at least one aperture on the reel hub adapter support module; and
wherein the reel hub adaptor support module comprises at least one hydraulic cylinder configured to move the at least one support pin between the storage position and the operational position.

16. The reel hub adapter support module as claimed in claim 15 wherein the reel hub adapter support module comprises at least one hydraulic cylinder configured to move the at least one support pin between the storage position and the operational position and at least one hydraulic cylinder configured to extend or retract the at least one support pin through the at least one aperture on the reel hub adapter support module.

17. The reel hub adapter support module as claimed in claim 15 wherein the reel hub adapter support module comprises a sliding drive unit and a crawler unit.

18. The reel hub adapter support module as claimed in claim 17 wherein the reel hub adapter support module comprises at least one hydraulic cylinder located between the sliding drive unit and the crawler unit.

19. The reel hub adapter support module as claimed in claim 17 wherein the sliding drive unit comprises at least one hydraulic cylinder configured to extend or retract the at least one support pin through an aperture on the sliding drive unit and through at least one aperture on at least one tower module.

20. The reel hub adapter support module as claimed in claim 17 wherein the crawler unit comprises at least one hydraulic cylinder configured to extend or retract the at least one support pin through an aperture on the crawler unit and through at least one aperture on at least one tower module.

21. The reel hub adapter support module as claimed in claim 17 wherein the sliding drive unit and/or the crawler unit comprises at least one positional hydraulic cylinder configured to move the at least one support pin between the storage position and the operational position.

22. The reel hub adapter support module as claimed in claim 17 wherein the sliding drive unit and/or the crawler unit comprises a protective frame configured to protect the at least one support pin when in a storage position.

23. A method of assembling a modular reel drive assembly comprising the steps of:
providing two reel drive tower modules; and
a reel hub adapter support module comprising:
at least one support pin configured to extend through at least one aperture on the reel hub adapter support module;
at least one hydraulic cylinder configured to move the at least one support pin between a storage position and an operational position;
mounting the reel hub adapter support module between the two reel drive tower modules; and
moving the at least one support pin from the storage position in which the at least one support pin is not aligned with at least one aperture on the reel hub adapter support module to the operational position in which the at least one support pin is aligned with at least one aperture on the hub adapter support module.

24. The method as claimed in claim 23 comprising extending the at least one support pin through the at least one aperture on the reel hub adapter support module and through at least one aperture on at least one reel drive tower module.

25. The method as claimed in claim 23 comprising controlling the extension of the at least one support pin through the at least one aperture on the reel hub adapter support module and through at least one aperture on at least one reel drive tower module.

26. The method as claimed in claim 23 comprising controlling the movement of the at least one support pin from the storage position and the operational position.

27. A method of disassembling a modular reel drive assembly comprising the steps of:
providing a modular reel drive assembly comprising two reel drive tower modules and a reel drive hub adapter support module mounted between the two reel drive tower modules;
wherein the reel hub adapter support module comprises at least one support pin configured to extend through at least one aperture on the hub adapter support module;
wherein the reel hub adaptor support module comprises at least one hydraulic cylinder configured to move the at least one support pin between a storage position and an operational position
moving the at least one support pin from the operational position in which the at least one support pin is aligned with at least one aperture on the reel hub adapter support module to the storage position in which the at least one support pin is not aligned with at least one aperture on the hub adapter support module; and
removing the reel hub adapter support module from between the two reel drive tower modules.

28. The method as claimed in claim 27 comprising retracting the at least one support pin through the at least one aperture on the reel hub adapter support module and/or through at least one aperture on at least one reel drive tower module prior to moving the at least one support pin from the operational position to the storage position.

29. The method as claimed in claim 27 comprising controlling the retraction of the at least one support pin through the at least one aperture on the reel hub adapter support module and through at least one aperture on at least one reel drive tower module.

30. The method as claimed in claim 27 comprising controlling the movement of the at least one support pin from the operational position to the storage position.

* * * * *